(12) United States Patent
Bartlett et al.

(10) Patent No.: US 11,077,590 B2
(45) Date of Patent: Aug. 3, 2021

(54) MOLD ASSEMBLY AND METHOD OF MOLDING A COMPONENT

(71) Applicant: The United States of America, as represented by the Secretary of the Navy, Crane, IN (US)

(72) Inventors: David Bartlett, Mitchell, IN (US); Elizabeth O'Neill, Washington, IN (US); Robert Moser, Heltonville, IN (US); Roger Dickerhoof, Bloomington, IN (US); Carl Miller, Bedford, IN (US); Joshua Jeffers, Loogootee, IN (US); Bryan Woosley, Bedford, IN (US); James Merryfield, Bedford, IN (US)

(73) Assignee: The United States of America, as represented by the Secretary of the Navy, Washington, DC (US)

(*) Notice: Subject to any disclaimer, the term of this patent is extended or adjusted under 35 U.S.C. 154(b) by 296 days.

(21) Appl. No.: 16/364,542

(22) Filed: Mar. 26, 2019

(65) Prior Publication Data

US 2020/0108534 A1     Apr. 9, 2020

Related U.S. Application Data

(62) Division of application No. 14/984,080, filed on Dec. 30, 2015, now Pat. No. 10,279,519.

(51) Int. Cl.
| | | |
|---|---|---|
| B29C 45/14 | (2006.01) | |
| B29C 45/00 | (2006.01) | |
| C08L 63/00 | (2006.01) | |
| B29C 45/26 | (2006.01) | |
| B29C 45/64 | (2006.01) | |
| C08G 73/00 | (2006.01) | |
| B29K 63/00 | (2006.01) | |
| B29L 31/36 | (2006.01) | |
| H01R 43/00 | (2006.01) | |

(52) U.S. Cl.
CPC .... *B29C 45/14639* (2013.01); *B29C 45/0001* (2013.01); *B29C 45/14549* (2013.01); *B29C 45/26* (2013.01); *B29C 45/64* (2013.01); *C08G 73/00* (2013.01); *C08L 63/00* (2013.01); *B29K 2063/00* (2013.01); *B29L 2031/36* (2013.01); *H01R 43/005* (2013.01)

(58) Field of Classification Search
CPC ..................... B29C 45/14639; B29C 45/0001
See application file for complete search history.

(56) References Cited

U.S. PATENT DOCUMENTS

| | | | | |
|---|---|---|---|---|
| 3,964,845 A | * | 6/1976 | Duggan | ............ B29C 45/14639 425/13 |
| 2006/0099846 A1 | * | 5/2006 | Channell, Sr. | .... B29C 45/14426 439/411 |

(Continued)

*Primary Examiner* — Galen H Hauth
(74) *Attorney, Agent, or Firm* — Naval Surface Warfare Center, Crane Division; Eric VanWittenburg

(57) ABSTRACT

A mold assembly includes a first upper portion, a second upper portion, and a base removably coupled to each other. A method of manufacturing an electrical connector with the mold assembly includes preheating a resin, mixing the resin with a hardener, preheating the mold assembly, injecting the resin hardener mixture into the mold assembly, and curing the resin hardener mixture.

5 Claims, 7 Drawing Sheets

(56) References Cited

U.S. PATENT DOCUMENTS

| | | | |
|---|---|---|---|
| 2008/0272509 A1* | 11/2008 | Sakai | B29C 45/14016 264/40.5 |
| 2011/0177720 A1* | 7/2011 | Cortes Roque | H01R 13/405 439/660 |
| 2018/0117798 A1* | 5/2018 | Sato | B29C 33/42 |

* cited by examiner

MOLD ASSEMBLY AND METHOD OF MOLDING A COMPONENT

CROSS-REFERENCE TO RELATED APPLICATIONS

This application is a divisional of and claims priority to U.S. Non-Provisional application Ser. No. 14/984,080, filed on Dec. 30, 2015 and titled "A MOLD ASSEMBLY AND METHOD OF MOLDING A COMPONENT," the disclosure of which is expressly incorporated herein by reference.

STATEMENT REGARDING FEDERALLY SPONSORED RESEARCH OR DEVELOPMENT

The invention described herein includes contributions by one or more employees of the Department of the Navy made in performance of official duties and may be manufactured, used and licensed by or for the United States Government for any governmental purpose without payment of any royalties thereon. This invention (Navy Case 200,521) is assigned to the United States Government and is available for licensing for commercial purposes. Licensing and technical inquiries may be directed to the Technology Transfer Office, Naval Surface Warfare Center Crane, email: Cran_CTO@navy.mil.

FIELD OF THE DISCLOSURE

The present invention relates generally to a mold assembly and a method of molding a component and, in particular, to a mold assembly and a method of manufacturing an electrical component with the mold assembly.

BACKGROUND OF THE DISCLOSURE

Various components may be used for underwater applications. If the component is an electrical component, the component should be completely cured such that the component is waterproof to electrical shorting or damage to the electrical component from contact with water. A plurality of materials and processes may be used to mold various components for underwater electrical applications.

In one illustrative embodiment, electrical components may be made from various resins injected into closed molds, for example through injection molding. However, injection molding certain materials to form electrical components may result in an electrical component with increased air voids due to an increase in the resin viscosity during injection molding. Additionally, injection molded components may require a longer (for example, 24-hour) cure time, which decreases the ability to make large quantities of electrical components in a limited period of time. Furthermore, various electrical components formed through injection molding processes may be brittle, thereby increasing the likelihood of failure or breakage of the component.

SUMMARY OF THE DISCLOSURE

However, certain materials such as epoxy resins, may be molded through various processes which result in a shorter cure time and decreased brittleness of the electrical component. In one embodiment, Chockfast Orange® is an epoxy resin developed by ITW Engineered Polymers of Montgomeryville, Pa., which may be used to mold various electrical components, such as electrical connectors, for underwater applications. In one embodiment, Chockfast Orange® may be poured into an open mold at room temperature with a 20:1 mixed ratio of resin to hardener and cured at a room temperature for less than approximately 24 hours.

In one illustrative embodiment of the present disclosure, a method of manufacturing an electrical connector includes preheating a resin composition, mixing the resin composition with a hardener to form a resin-hardener mixture, preheating a mold assembly, injecting the resin-hardener mixture into the mold assembly, and curing the mixture for less than 24 hours.

In another illustrative embodiment of the present disclosure, a method of manufacturing an electrical connector includes preheating a resin composition for up to 30 minutes at a temperature between 100° F. and 150° F., mixing the resin composition with a hardener to form a resin-hardener mixture at a resin to hardener ratio between 12:1 and 25:1, preheating a mold assembly to a temperature between 75° F. and 125° F. for at least 30 minutes, injecting the resin-hardener mixture into the mold assembly at a pressure of 1-8 psig, and curing the mixture for less than 24 hours.

In a further illustrative embodiment of the present disclosure, a mold assembly includes a first upper portion, a second upper portion, and a base. The base, the first upper portion, and the second upper portion are each removably coupled to each other, and the configuration of the first upper portion, the second upper portion, and the base creates a channel that extends along a length of the base to accommodate a plurality of wires within the channel. The first upper portion and the second upper portion each have a bottom surface wherein the bottom surface of the second upper portion is closer to a bottom surface of the base than the bottom surface of the first upper portion. Additionally, a locator plate is removably coupled to the first upper portion, the second upper portion, and the base.

In another illustrative embodiment of the present disclosure, an assembly comprises a mold assembly and a cable configured to be positioned within the mold assembly. The cable includes a plurality of wires. The assembly also comprises a clamp removably coupled to a portion of the cable extending from the mold assembly and a storage unit for supporting a portion of the cable. The clamp is positioned intermediate the storage unit and the mold assembly.

In a further illustrative embodiment of the present disclosure, an assembly comprises a storage unit and a cable containing a plurality of wires. The cable is supported by the storage unit. The assembly also comprises a workbench including a workbench track and a workbench track rests on the workbench. The cable is positioned within the workbench track. The assembly also comprises a clamp removably coupled to the cable and a mold assembly configured to receive the cable. The mold assembly includes a first upper portion, a second upper portion, and a base, wherein the base, the first upper portion, and the second upper portion are each removably coupled to each other. The configuration of the first upper portion, the second upper portion, and the base creates a channel that extends along a length of the base to accommodate the cable within the channel. The base includes a bottom surface, a first top surface, and a second top surface such that the first top surface is at a greater distance from the bottom surface of the base than the second top surface. The first upper portion and the second upper portion each have a bottom surface, wherein the bottom surface of the second upper portion is closer to the bottom surface of the base than the bottom surface of the first upper portion. The mold assembly also includes a locator plate removably coupled to the first upper portion, the second upper portion, and the base, wherein the locator plate includes a plurality of holes each configured to receive one of a plurality of pins includes on the plurality of wires of the cable.

BRIEF DESCRIPTION OF THE DRAWINGS

The above mentioned and other features of this invention, and the manner of attaining them, will become more apparent and the invention itself will be better understood by reference to the following description of embodiments of the invention taken in conjunction with the accompanying drawings, where.

Corresponding reference characters indicate corresponding parts throughout the several views. Unless stated otherwise the drawings are proportional.

DETAILED DESCRIPTION OF THE DRAWINGS

Figure 1:
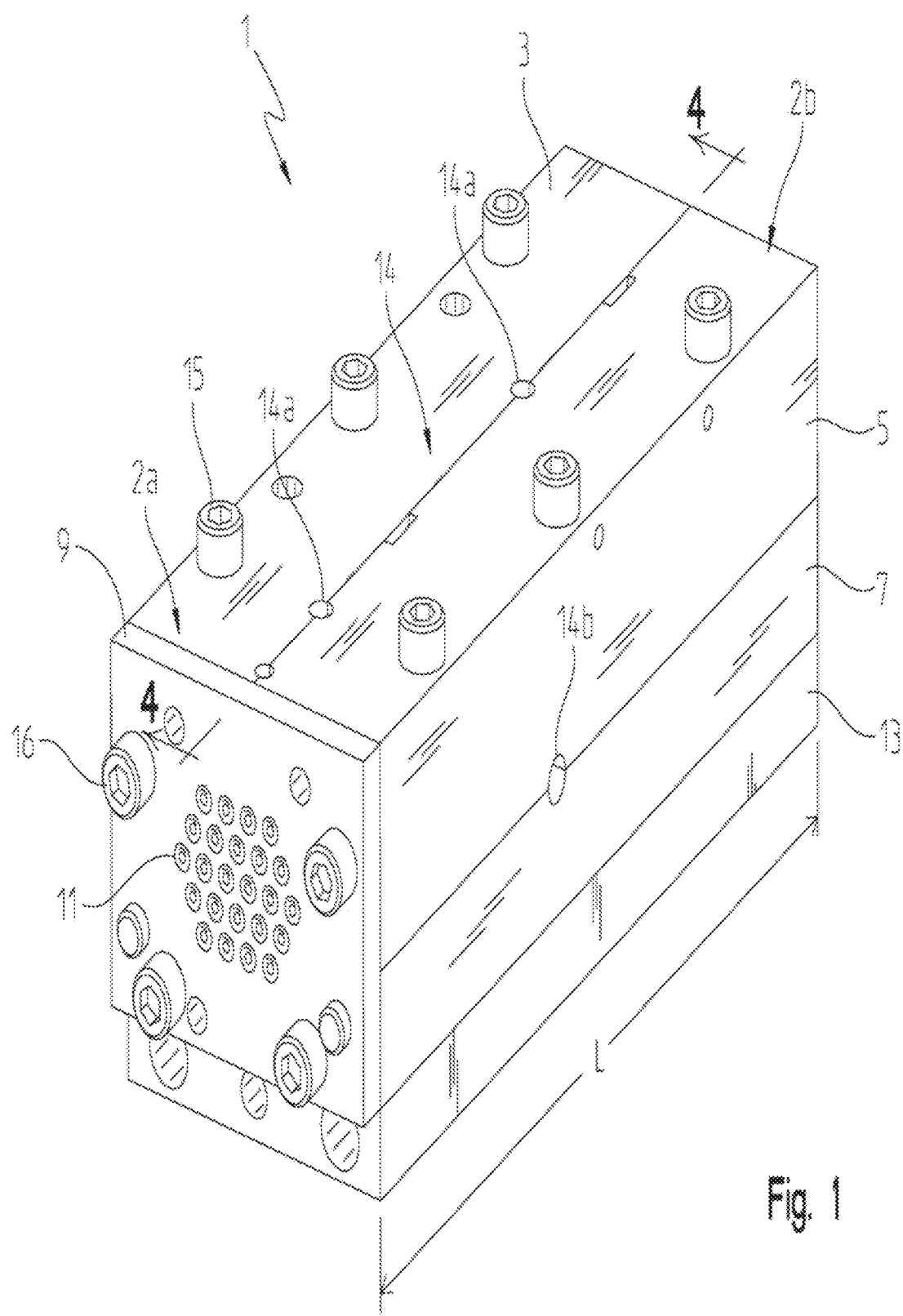
FIG. 1 is a front perspective view of an illustrative mold assembly in accordance with the present disclosure.

For the purposes of promoting an understanding of the principles of the present disclosure, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. Therefore, no limitation of the scope of the claimed invention is thereby intended. The present invention includes any alterations and further modifications of the illustrated devices and described methods and further applications of the principles of the invention which would normally occur to one skilled in the art to which the invention relates.

Figure 2:
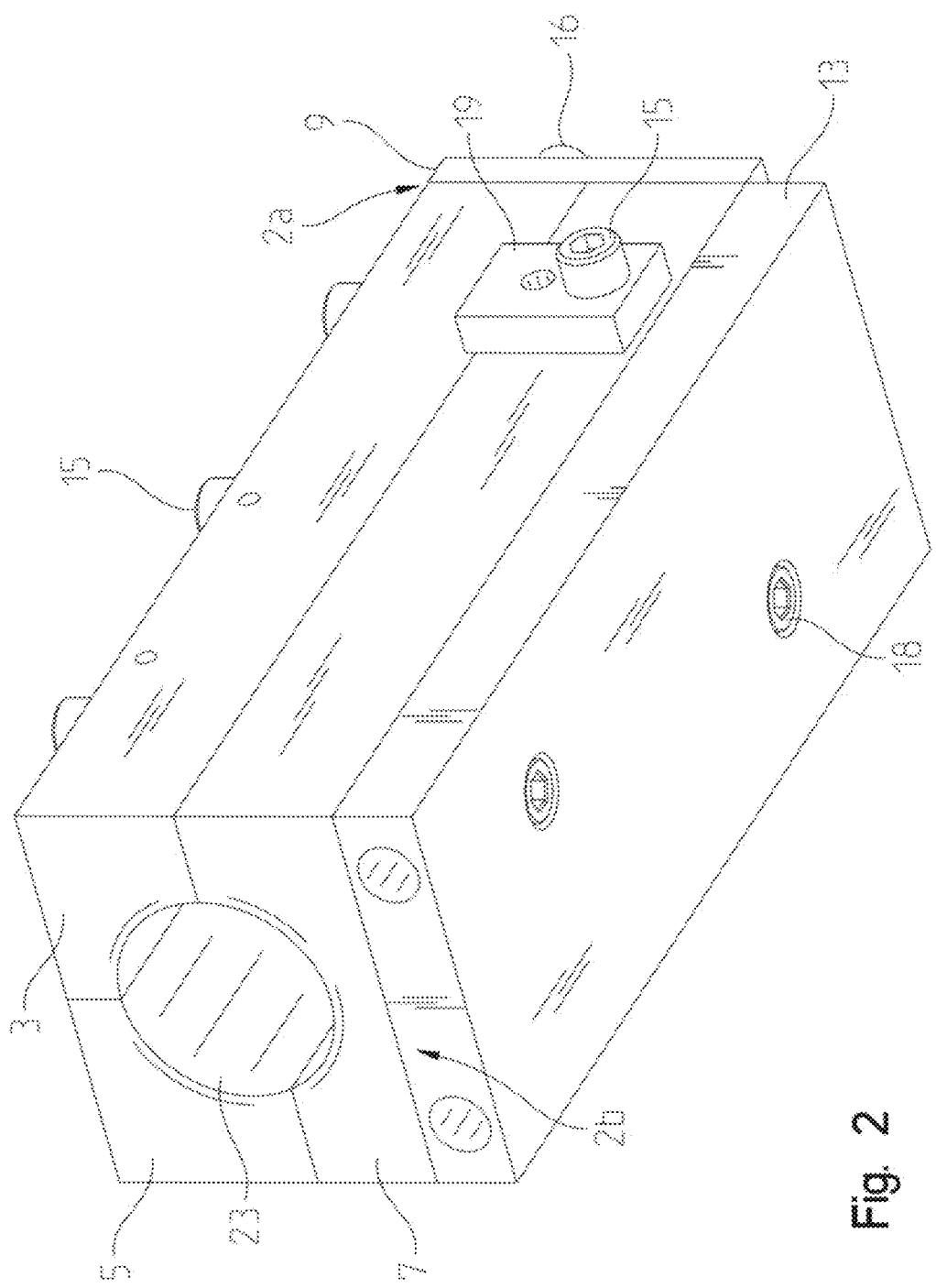
FIG. 2 is a rear perspective view of an underside of the mold assembly of FIG. 1.
Figure 3:
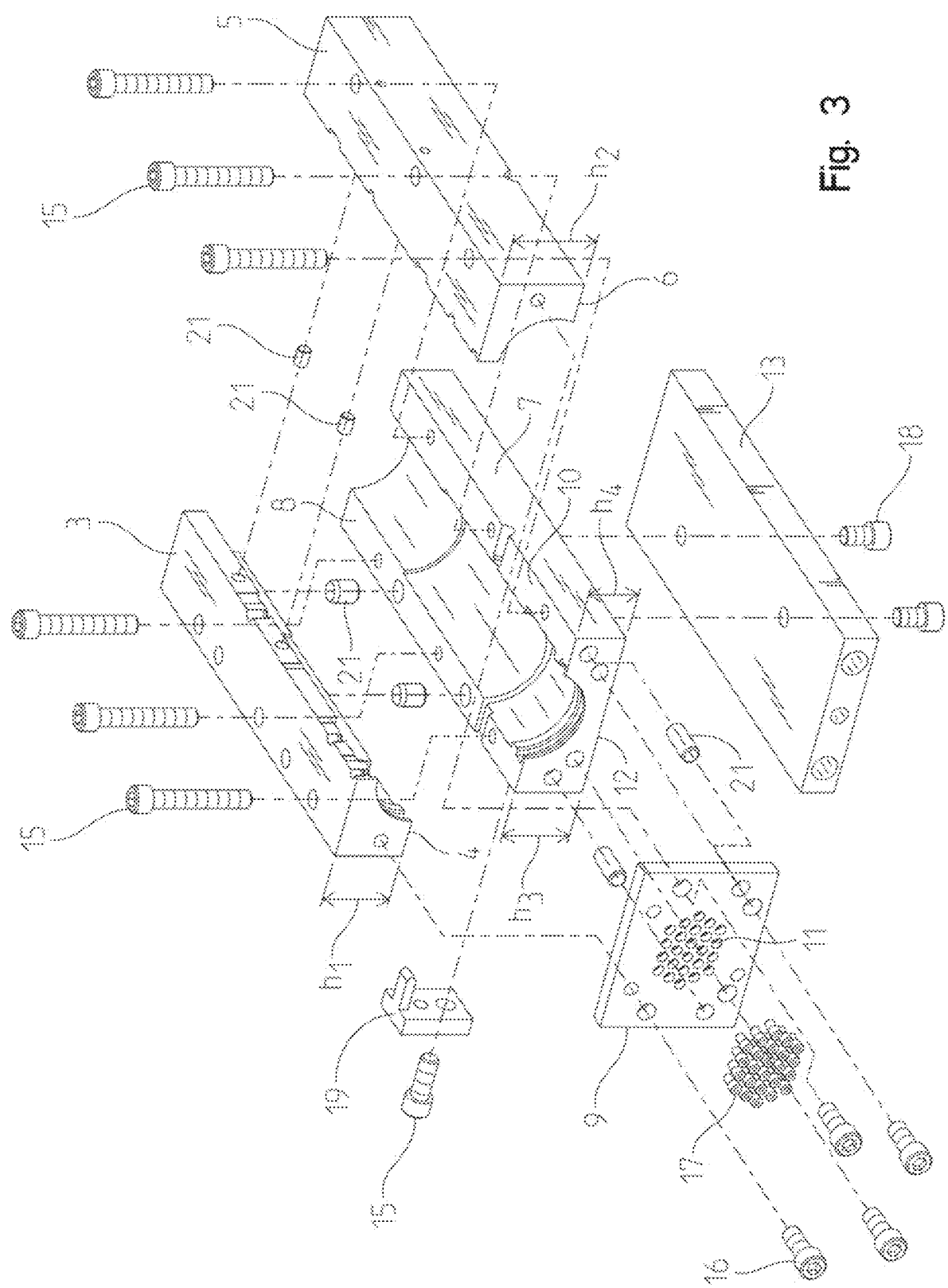
FIG. 3 is an exploded perspective view of the mold assembly of FIG. 1.
Figure 4:
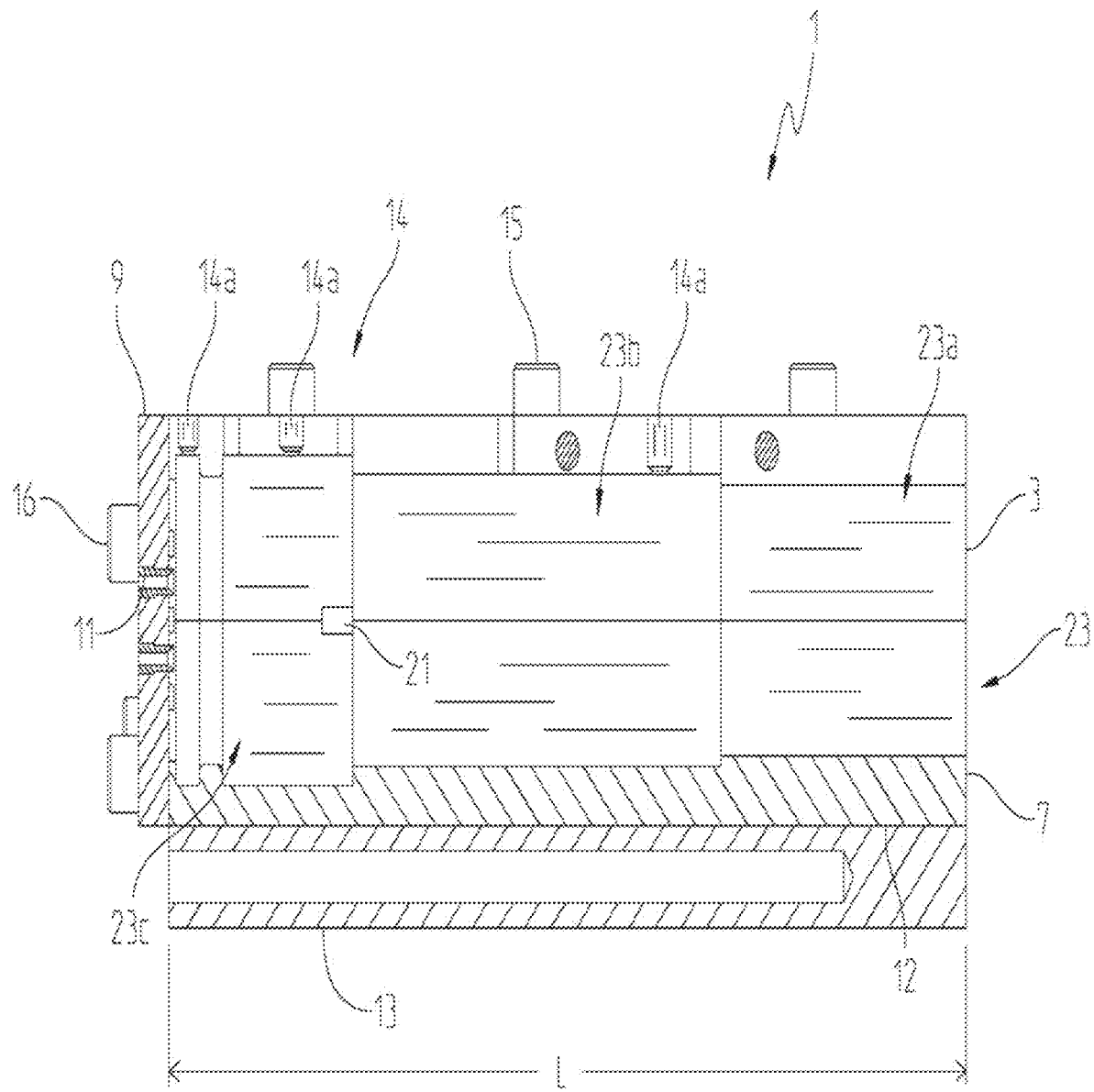
FIG. 4 is a cross-sectional view of the mold assembly of FIG. 1, taken along line 4-4 of FIG. 1.

Referring to FIGS. 1-4, an illustrative embodiment of a mold assembly 1 is shown. Mold assembly 1 includes a first upper portion 3, a second upper portion 5, and a base 7 removably coupled to each other by at least one fastener 15, illustratively a plurality of screws, and at least one coupler 21, illustratively a plurality of dowel pins (FIG. 3). When first upper portion 3, second upper portion 5, and base 7 are coupled to each other, a plurality of processing ports 14 are defined at the interface between first upper portion 3 and second upper portion 5 and at the interface between at least second upper portion 6 and base 7, as shown in FIG. 1. When first and second upper portions 3, 5 are coupled together, at least one, and illustratively three upper processing ports 14 are defined there between, as shown in FIGS. 1 and 4. Upper processing ports 14a are configured to operate as air vents and/or material overflow ports for mold assembly 1. Additionally, a lower processing port 14b is defined at the interface of at least second upper portion 5 and base 7.

Lower processing port 14b defines an injection port into which a material may be injected during a molding process, as disclosed further herein. Illustratively, first and second upper portions 3, 5 each includes a bottom surface 4, 6 which abuts top surfaces 8, 10 of base 7, respectively, as disclosed herein. Base 7 also includes a bottom surface 12 opposing top surfaces 8, 10.

In one embodiment, first upper portion 3 and second upper portion 5 are mirror-image components of each other. Alternatively, as shown in FIGS. 2 and 3, first and second upper portions 3, 5 are not identical components of mold assembly 1 in that second upper portion 5 has a larger size than first upper portion 3. For example, bottom surface 6 of second upper portion 5 has a vertical length or height $h_2$ greater than a vertical length or height $h_1$ of first upper portion 3 such that bottom surface 6 of second upper portion 5 is closer to bottom surface 12 of base 7 than is bottom surface 4 of first upper portion 3. As a result, first upper portion 3 and second upper portion 5 are not identical parts primarily due to the differences in height.

To accommodate the different sizes of first and second upper portions 3, 5, base 7 has first top surface 8 and second top surface 10, as shown in FIG. 3. First top surface 8 abuts bottom surface 4 of first upper portion 3 when first upper portion 3 is coupled to base 7. Second top surface 10 abuts bottom surface 6 of second upper portion 5 when second upper portion 5 is coupled to base 7. In the present embodiment, first top surface 8 has a greater vertical distance or height $h_3$ from bottom surface 12 of base 7 than the vertical distance or height $h_4$ from second top surface 10 to bottom surface 12, to accommodate the difference in height between first upper portion 3 and second upper portion 5. In an alternative embodiment, first top surface 8 and second top surface 10 of base 7 do not vary in height with respect to bottom surface 12 of base 7.

Referring to FIG. 2, a rear end 2b of mold assembly 1 is shown and includes a channel 23. Channel 23 is defined by the inward facing surfaces of first upper portion 3, second upper portion 5, and base 7 when first upper portion 3, second upper portion 5, and base 7 are coupled to one another. Channel 23 spans a length L of mold assembly 1 (FIG. 4). In one exemplary embodiment, length L corresponds to a length of base 7. In an alternative embodiment, length L corresponds with a length of either first upper portion 3 or second upper portion 5. Channel 23 is configured to receive at least one wire or cable 25, as disclosed herein.

Figure 5:
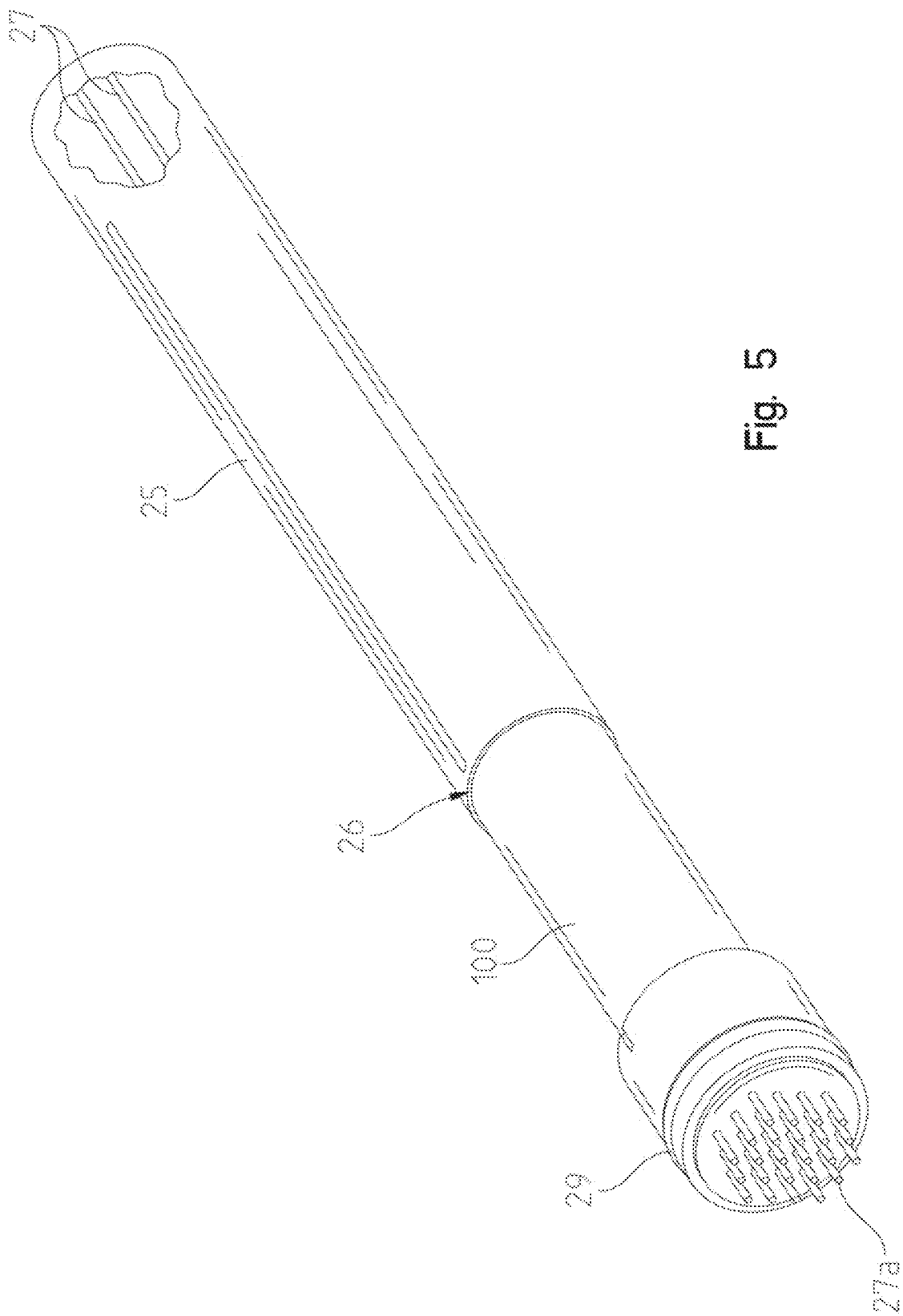
FIG. 5 is a front perspective view of an electrical connector cable formed with an electrical connector within the mold assembly of FIG. 1.

Referring to FIGS. 1, 3, and 4, at a front end 2a of mold assembly 1, a locator plate 9 of mold assembly 1 is removably coupled to first upper portion 3, second upper portion 5, and base 7 by at least one fastener 16, illustratively a plurality of screws. Locator plate 9 includes a plurality of holes 11 which open to channel 23 and are configured to receive individual connector pins of electrical wires, as disclosed further herein. For example, in one embodiment, holes 11 of locator plate 9 each are configured to receive one of a plurality of connector pins 27a of each electrical wire 27 of cable 25 (FIG. 5). Holes 11 are spaced apart from one another such that there is sufficient space for each pin 27a of each wire 27 to engage with hole 11 without interfering with another pin 27a. Also, holes 11 extend axially from locator plate 9 and away from front end 2a of mold assembly 1. As such, locator plate 9 provides a relative placement of each pin 27a spatially oriented relative to each other and also axially positions each pin 27a. Each hole 11 also may include a sleeve 17 removably inserted therein and configured to receive each pin 27a or any other wire, cable, pin, or other electrical component, as shown in FIG. 3. Additionally, an insert 19 is removably coupled to mold assembly 1 and is inserted at the interface of bottom surface 4 of first upper portion 3 and top surface 8 of base 7 (FIG. 3). Insert 19 facilitates the assembly and disassembly of mold assembly 1.

Referring still to FIGS. 1-4, in one embodiment, a heating plate 13 is removably coupled to mold assembly 1 and, more particularly, to a bottom surface 12 of base 7 by at least one fastener 18, illustratively a plurality of screws (FIGS. 2-3). In an exemplary embodiment, heating plate 13 is electrically coupled to a power source (not shown) by at least one cable 30 (FIG. 6) where the power source enables heating plate 13 to increase the temperature of base 7.

By having mold assembly 1 comprise multiple discrete parts—first upper portion 3, second upper portion 5, base 7, and locator plate 9—mold assembly 1 is easily disassembled and/or reassembled as needed. Additionally, the configuration of heights h1, h2, h3, h4 of first upper portion 3, second upper portion 5, and base 7 allow for easy assembly and disassembly of mold assembly 1 and facilitates removal of a component formed therein. More particularly, if a component is formed within mold assembly 1, the component is easily removed from mold assembly 1 without damage thereto by removing fasteners 15, 16, 18 and couplers 21 from mold assembly 1. Alternatively, couplers 21 may be pressed fit and remain within mold assembly 1 during disassembly of mold assembly 1. Also, improved cleaning of mold assembly 1 can be achieved as each individual part can be cleaned separately.

Figure 6:
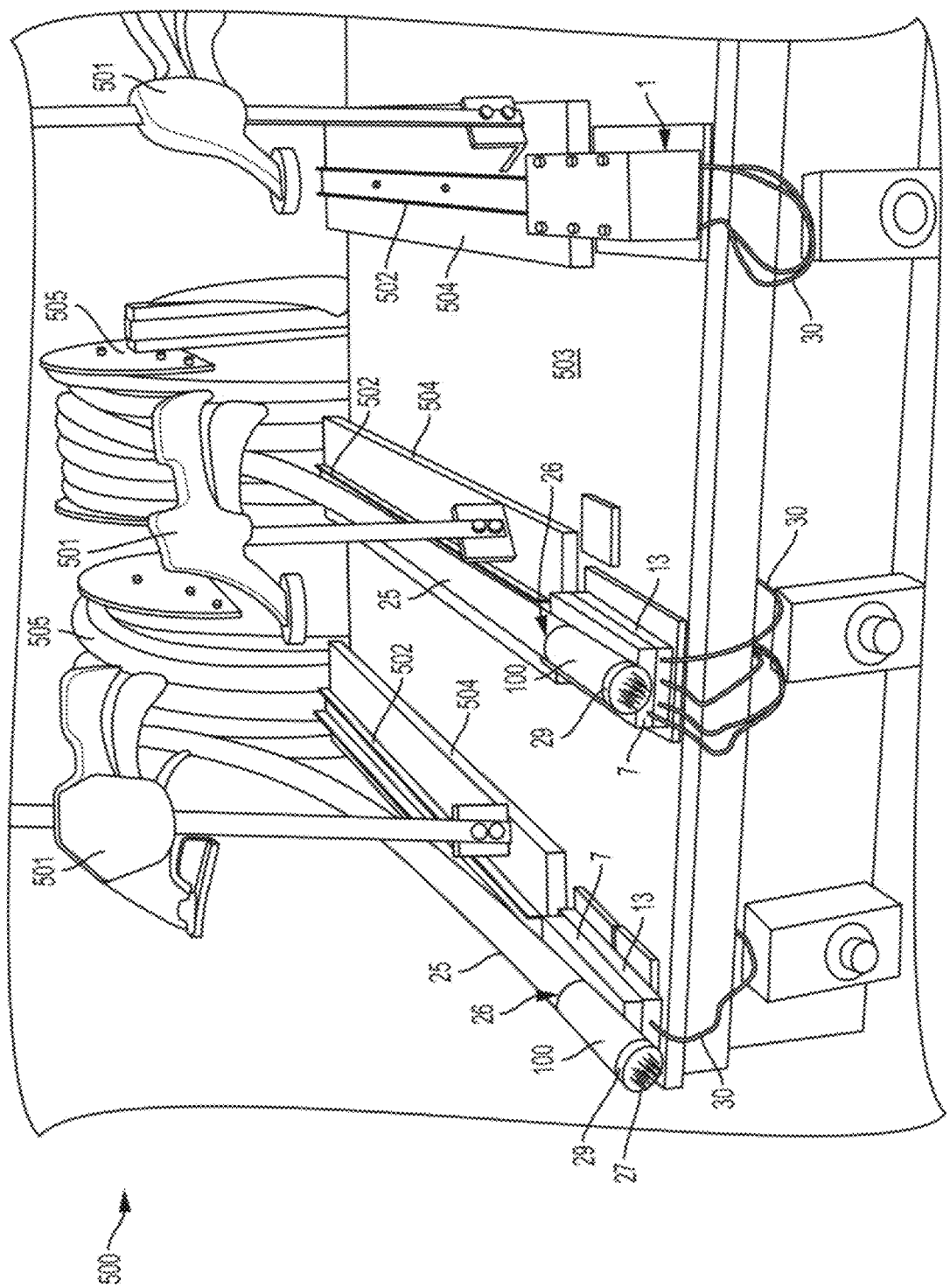
FIG. 6 is a perspective view of a plurality of mold assemblies for forming the electrical connector cable of FIG. 5.

Referring to FIGS. 5 and 6, a cable 25 is configured to be positioned within channel 23 at rear end 2b of mold assembly 1 to form an electrical connector 100 at a distal end 26 of cable 25. Cable 25 encloses a plurality of electrical wires or lines 27 which extend through distal end 26 and terminate in a pin 27a. Electrical connector 100 is positioned intermediate distal end 26 and pins 27a and is comprised of a polymeric material. For example, electrical connector 100 may be comprised of 100% solids, two component inert compounds comprised of a resin and a hardener. More particularly, the material may include between 30% and 60% concentration of a crystalline silica, between 30% and 60% concentration of an epoxy resin, and between 5% and 15% concentration of a limestone, where the epoxy resin is a reaction product of bisphenol A and epichlorohydrin. In one embodiment, electrical connector 100 is comprised of Chockfast Orange®.

Figure 7:
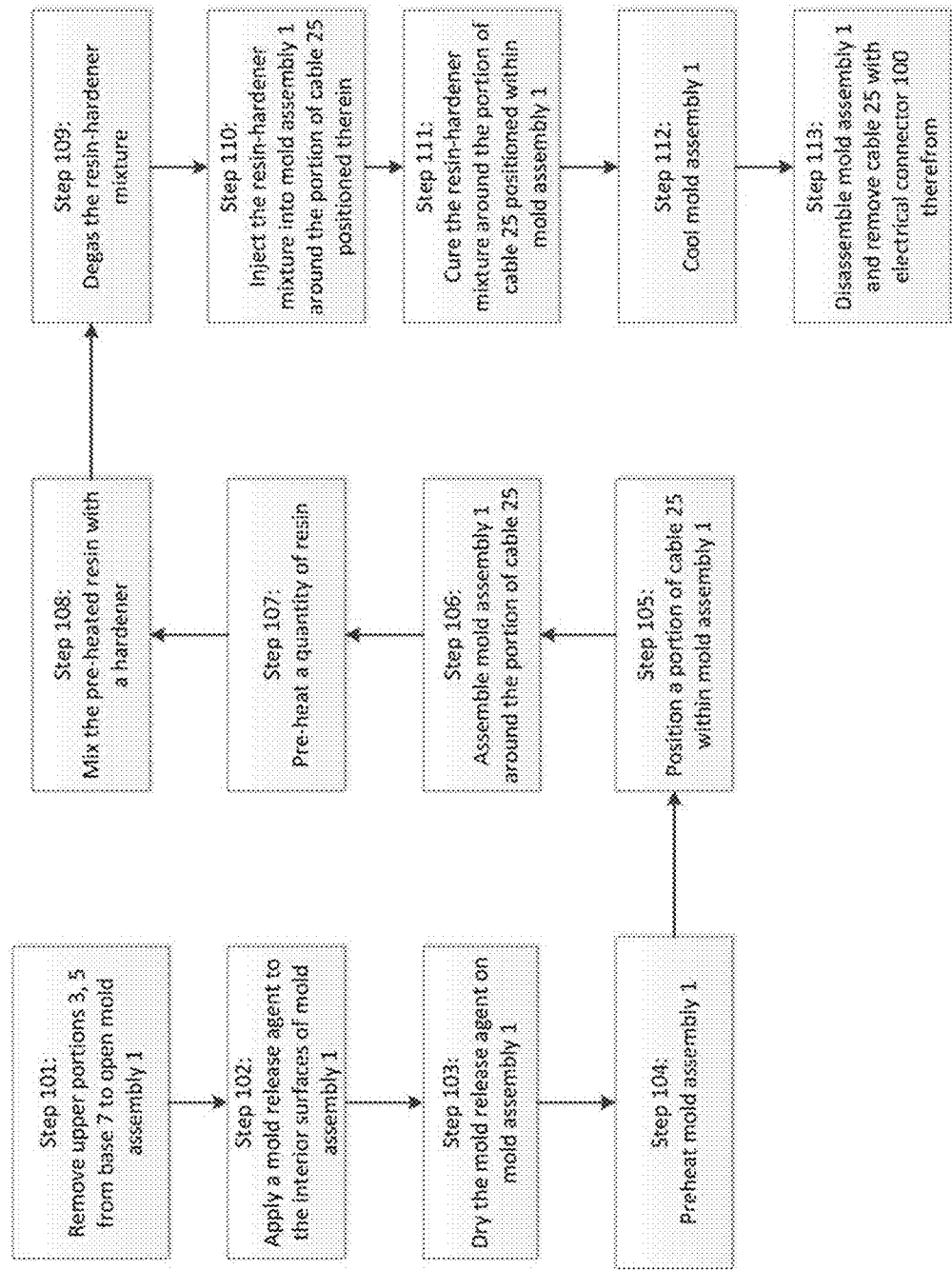
FIG. 7 is a flow chart of an illustrative method of manufacturing the electrical connector cable of FIG. 5 according to the mold assembly of FIG. 6.

Referring to FIGS. 4-7, to form electrical connector 100, first and second upper portions 3, 5 are removed from base 7 and all portions of mold assembly 1 are cleaned, including the interior surfaces of first upper portion 3, second upper portion 5, and base 7, as shown in Step 101 of FIG. 7. For example, mold assembly 1 may be cleaned with alcohol and a lint-free cloth.

Before positioning anything in mold assembly 1, a mold release agent may be applied to the interior surfaces thereof to easily release any components from mold assembly 1, as shown in Step 102 of FIG. 7. Once the mold release agent is applied, the components of mold assembly 1 dry for approximately 3-10 minutes and, more particularly, for approximately 5 minutes, as shown in Step 103 of FIG. 7. Additional applications of the mold release agent may be applied 1-5 more times with periods of drying in between. In one exemplary embodiment, the mold release agent is Freekote CUR available from Henkel Corporation.

Once mold assembly 1 is prepared, mold assembly 1 may be heated with heating plate 13, as shown in Step 104 of FIG. 7. For example, mold assembly 1 may be heated for up to 60 minutes and, more particularly, approximately 15-45 minutes and, even more particularly, approximately 20-30 minutes at a temperature of 75-125° F. and, more particularly, approximately 100° F.

Referring to Step 105 of FIG. 7, distal end 26 of cable 25 is placed within a first portion 23a of channel 23 of mold assembly 1 and each wire extends through channel 23 over length L towards locator plate 9. Each pin 27a of each wire 27 is received within a corresponding sleeve 17 and hole 11 of locator plate 9. Sleeves 17 are placed over pins 27a to further protect pins 27a from potential damage during the molding process. Additionally, by positioning pins 27a within sleeves 17 and holes 11, the wires are held in place when a resin composition is added to channel 23 of mold assembly 1 to form electrical connector 100.

Mold assembly 1 is then assembled around cable 25 such that first and second upper portions 3, 5 are coupled to base 7 and locator plate 9, as shown in Step 106 of FIG. 7. With cable 25 positioned within mold assembly 1, the material comprising electrical connector 100 is prepared. More particularly, and using Chockfast Orange® as an illustrative embodiment of the material comprising electrical connector 100, as shown in Step 107, a measured quantity of the resin component of Chockfast Orange® is heated, for example in an oven, for less than 60 minutes and, more particularly, for 20-30 minutes, at a temperature of 100-150° F. and, more particularly, at 125-135° F.

After heating the resin component, the resin is mixed with the hardener to form Chockfast Orange®, as shown in Step 108 of FIG. 7. In one embodiment, the resin is mixed with the hardener in a 12:1 to 25:1 ratio of resin to hardener. Illustratively, electrical connector 100 is comprised of Chockfast Orange® with a 20:1 ratio of resin to hardener. The resin-hardener ratio enables the mixture to be molded at elevated temperatures without producing a brittle component in mold assembly 1. The resin-hardener mixture is stirred slowly to prevent pockets of air from forming in the mixture. Stirring is done until the resin and hardener are uniformly mixed up to approximately 1-5 minutes of mixing and, more particularly, approximately 2 minutes of mixing. After stirring, the resin-hardener mixture is degassed in a vacuum chamber for 1 minute, as shown in Step 109 of FIG. 7.

In Step 110 of FIG. 7, the resin-hardener mixture is injected into a second portion 23b (FIG. 4) of mold assembly 1 under pressure through lower processing port 14h (FIG. 1) until mold assembly 1 is filled to capacity with the mixture. In the present embodiment, the pressure may be as little as about 1-8 psig and, more particularly 3-4 psig. Additionally, the resin-hardener mixture is injected into a third portion 23c of channel 23 through lower processing port 14h to encompass a portion of pins 27a of cable 25. Due to the configuration of third portion 23a, an o-ring groove 29 may be molded into electrical connector 100 such that an o-ring (not shown) may be included on electrical connector 100 to sealingly secure electrical connector 100 to another electrical component.

Once mold assembly 1 is filled with the resin-hardener mixture, the resin-hardener mixture is cured for less than 24 hours in Step 111 of FIG. 7. More particularly, the curing process of Step 111 may be approximately one hour in which for approximately 30 minutes, heating plate 13 is turned off such that no additional heating to mold assembly 1 occurs. Subsequently, heating plate 13 may be turned back on to increase the temperature of mold assembly 1 to 115-150° F.

and, more particularly, to approximately 140° F. for the remaining 30 minutes of the 1-hour cure cycle.

As shown in Step 112 of FIG. 7, after Step 111 is completed, heating plate 13 is turned off and mold assembly 1 is allowed to cool for 1-15 minutes and, more particularly, 5 minutes. After the cooling cycle, at Step 113 of FIG. 7, mold assembly 1 is disassembled to remove first upper portion 3 and second upper portion 5 from base 7. With first and second upper portions 3, 5 removed, electrical connector 100 is positioned on base 7, as shown in FIG. 6. In this way, electrical connector 100 is positioned around a portion of the wires comprising cable 25 and is coupled to cable 25. As shown in FIG. 5, pins 27a of cable 25 extend from electrical connector 100 such that pins 27a may be electrically coupled to another component (not shown). Once cooled, cable 25, including electrical connector 100, may be removed from mold assembly 1 and electrically coupled with any other electrical component or system, depending on the application of cable 25.

In one embodiment, multiple mold assemblies 1 may be used to simultaneously form a plurality of electrical connectors 100, as shown in FIG. 6. For example, a plurality of bases 7 and heating plates 13 may be coupled to a workbench 503 and a workbench track 502 such that base 7 and heating plate 13 are stationary with respect to workbench 503 and workbench track 502.

Cable 25 may be positioned within workbench track 502 and may extend from mold assembly 1 to a clamp 501 and a storage unit 505, which are configured upstream of mold assembly 1. Clamp 501 may be removably coupled to cable 25 to further secure the alignment of distal end 26 of cable 25 within channel 23 of mold assembly 1 by preventing rotational or axial movement of cable 25. By limiting movement of cable 25, the positioning of pins 27a within holes 11 of locator plate 9 remains set and secure. In an exemplary embodiment, storage unit 505 may comprise of rolls, spools, or drums on which the remaining length of cable 25 is wound.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. An assembly comprising:
   a storage unit;
   a cable containing a plurality of wires and supported by the storage unit; a workbench including a workbench track, wherein the workbench track rests on the workbench and the cable is positioned within the workbench track;
   a clamp removably coupled to the cable;
   a mold assembly configured to receive the cable and including: a first upper portion, a second upper portion, and a base;
   wherein the base, the first upper portion, and the second upper portion are each removably coupled to each other and the configuration of the first upper portion, the second upper portion, and the base creates a channel that extends along a length of the base to accommodate the cable within the channel;
   wherein the base includes a bottom surface, a first top surface, and a second top surface such that the first top surface is at a greater distance from the bottom surface of the base than the second top surface;
   the first upper portion and the second upper portion each having a bottom surface wherein the bottom surface of the second upper portion is closer to the bottom surface of the base than the bottom surface of the first upper portion; and
   a locator plate removably coupled to the first upper portion, the second upper portion, and the base;
   wherein the locator plate includes a plurality of holes each configured to receive one of the plurality of wires of the cable.

2. The mold assembly of claim 1, wherein a cable containing a plurality of wires is positioned opposite of the locator plate and within the channel such that the plurality of wires extends through the channel and the plurality of wires extends towards the locator plate.

3. The mold assembly of claim 1, wherein the cable extends from the mold assembly to the clamp and the storage unit.

4. The assembly of claim 1, wherein the workbench supports the mold assembly, the clamp, and the cable.

5. The assembly of claim 1, wherein the clamp and the storage unit are upstream of the mold assembly.

* * * * *